United States Patent [19]
Sundstrom

[11] 3,910,360
[45] Oct. 7, 1975

[54] METHOD AND APPARATUS FOR COLLECTING AND SEPARATING DUST DURING AIR-FLUSHED ROCK DRILLING USING A VIBRATING FILTER

[75] Inventor: Nils Goran Sundstrom, Alta, Sweden

[73] Assignee: Atlas Copco Aktiebolag, Nacka, Sweden

[22] Filed: July 11, 1973

[21] Appl. No.: 378,223

[30] Foreign Application Priority Data
July 19, 1972 Sweden.................... 9465/72

[52] U.S. Cl. ............... 175/38; 55/96; 55/283; 55/300; 55/304; 55/337; 55/468; 173/3; 175/206
[51] Int. Cl.² ................ C09K 7/00; E21C 7/00
[58] Field of Search ......... 55/96, 97, 300, 304, 305, 55/341, 385, 283, 429, 468, 334–337; 173/3; 175/206, 66, 207, 212, 143, 38

[56] References Cited
UNITED STATES PATENTS

| | | | |
|---|---|---|---|
| 2,182,165 | 12/1939 | Smith | 175/206 |
| 2,781,104 | 2/1957 | Fischer | 55/304 |
| 2,975,847 | 3/1961 | Feuch | 175/206 |
| 3,343,342 | 9/1967 | Du Rocher | 55/304 |
| 3,399,777 | 9/1968 | Passalaqua | 210/332 |
| 3,528,514 | 9/1970 | Sandvig | 175/206 |
| 3,577,705 | 5/1971 | Sharlet | 55/283 |
| 3,651,621 | 3/1972 | Davis | 55/304 |

FOREIGN PATENTS OR APPLICATIONS

| | | | |
|---|---|---|---|
| 795,402 | 1/1936 | France | 175/206 |
| 490,783 | 2/1954 | Italy | 55/305 |

*Primary Examiner*—Bernard Nozick
*Attorney, Agent, or Firm*—Flynn & Frishauf

[57] ABSTRACT

A dust collecting device, intended for use at air-flushed rock drilling, is cleaned and discharged in that its air-flow-establishing air ejector is shut off and in that its fabric filter unit is vibrated, whereafter the device is opened and collected dust is removed. A control system for remote control prevents automatically the filter unit from being vibrated during suction of dust, said control system being connected to the flush air conduit of the rock drill for making the operation of the dust collecting device responsive to the position of the flush air throttle valve. The control system also comprises a timing unit for determining of the time interval during which the filter unit is exposed to vibrations.

13 Claims, 4 Drawing Figures

METHOD AND APPARATUS FOR COLLECTING AND SEPARATING DUST DURING AIR-FLUSHED ROCK DRILLING USING A VIBRATING FILTER

This invention relates to a method for cleaning and discharging of a dust collecting device intended for use at air-flushed rock drilling. More particularly, the invention relates to a method for cleaning and discharging of a dust collecting device which comprises a fabric filter unit, a vibrator means connected to said filter unit and a detachable dust receptacle.

In previous types of vibrator-cleaned dust collectors the filter unit has not been protected from being vibrated during dust collecting, e.g. when a dust containing air flow passes through the filter unit. This is a serious problem because if the filter unit is exposed to vibrations when it is active as a dust collector a considerable amount of dust will pass through the filter unit and escape into the atmosphere. It will also give rise to a choking-up of the filter unit, whereby the capacity of the latter decreases and vibration cleaning thereof is not effective any longer.

Another problem arising with vibrator-cleaned dust collectors is that vibrating of the filter unit must not exceed a certain period of time, otherwise, the filter unit life will be strongly reduced, due to hard wear.

The present invention intends to solve these problems, which is accomplished by the method and the apparatus recited in the claims.

The invention will hereinafter be described in detail with reference to the drawings, in which FIG. 1 is a horizontal, sectional view of a dust collecting device according to the invention. FIG. 1 also contains a manual control system for the air ejector and the vibrator.

Figure 1:
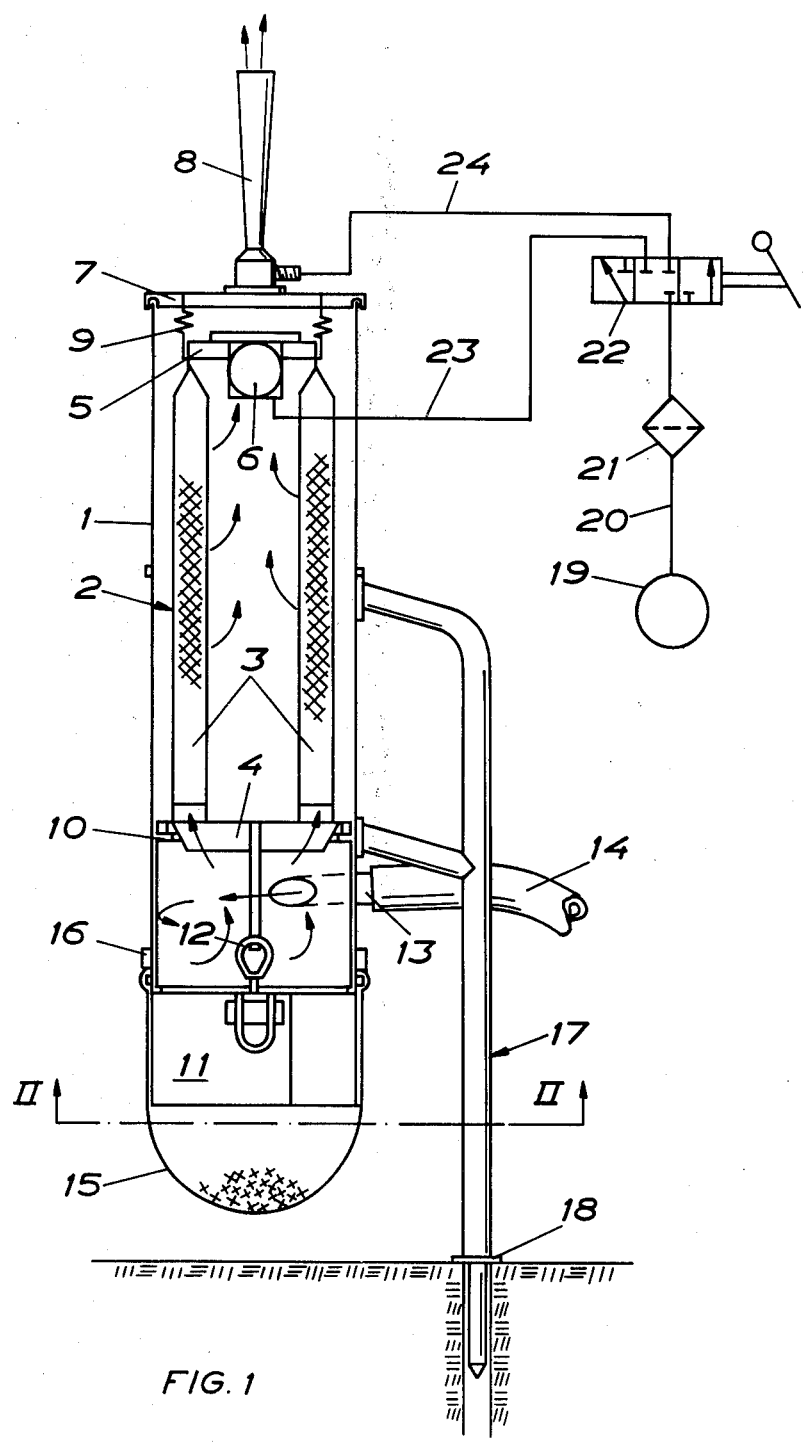
Figure 2:
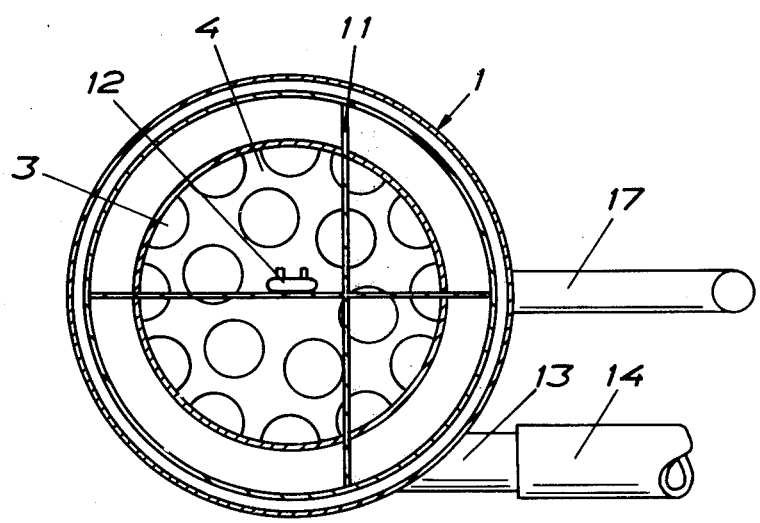
FIG. 2 is a sectional view along line II-II in FIG. 1.

The dust collecting device shown in the drawing comprises a tube-shaped housing 1 which is made of steel plate or the like. The housing contains a filter unit 2 constituted by a number of fabric hoses 3 which are closed at their upper ends and directed parallelly with the housing. At their lower, open ends, the hoses 3 are connected to a socket frame 4 which are provided with a number of mounting sockets the number of which corresponds to that of the hoses. The hoses 3 are attached to the socket frame 4 by means of clamps. (Not shown.) At their upper, closed ends, the hoses 3 are connected to a common mounting frame 5. To the mounting frame 5 there is also attached a vibrator 6 of the rotating-ball type. Moreover, the housing 1 is provided with a top closure 7 upon which an air ejector 8 is mounted. The air ejector 8 is supplied with pressure air and is arranged to transport cleaned air out of the housing 1. The top closure 7 is retained against the top end of the housing by means of springs 9 which are connected to the mounting frame 5.

The socket frame 4 is provided with a downwardly tapering outer surface which is intended to sealingly rest upon an annular flange 10 within the housing 1. At the lower end of the housing, there is arranged a plate cross 11 which is intended to be retained against the lower end of the housing by means of the springs 9. The biasing force of the springs 9 are transferred to the plate cross 11 by the fabric hoses 3, the socket frame 4 and a clamping device 12. Dismantling of the dust collecting device is carried out by undoing the clamping device 12, whereupon all the above mentioned parts except for the plate cross 11, can be lifted out from the housing. Yet, the plate cross 11 has to be lowered down.

Between the annular flange 10 and the bottom end of the housing 1, the housing is provided with a tangentially directed air inlet 13 through which dust containing air enters the housing 1 from a hose 14. The hose 14 is connected to a rock drill, in order to convey drill dust containing air to the dust collecting device. As the air inlet 13 is tangentially directed, this part of the housing 1 acts as a cyclone. This means that the dust particles follow the inner wall of the housing and, as the air flow enters the filter unit 2 through the centre part of the socket frame 4, a considerable amount of the dust particles leaves the air flow and falls down into the receptacle 15 along the inner wall of the housing. Moreover, when the air flow enters the housing the air flow velocity is strongly reduced whereby the changes for the dust particles to leave the air flow is increased.

Around the plate cross 11, the lower part of the housing is provided with a dust collecting receptacle 15 which very well could be a plastic sack. This receptacle is mounted on the lower part of the housing 1 by means of a strap 16.

The plate cross 11 has two objects one of which is to prevent the receptacle 15 from being sucked into the housing when the air ejector is working. The other object is to slow down the air rotation in the lower part of the housing and thereby make it easier for the dust particles to set in the receptacle.

The dust collecting device which is shown in FIG. 1 has a one-leg stand 17 which is intended to be set up in a vertically hole in the rock. For that purpose the lower end of the stand is provided with a collar 18 the object of which is to rest against the rock surface.

In FIG. 1 there is also shown a manually operated control system for the air ejector 8 and the vibrator 6. This system contains a pressure air source 19, a supply conduit 20 for pressure air, an air cleaner 21 and a control valve 22. The latter is connected to the vibrator 6 via a conduit 23 and to the ejector via conduit 24. The control valve 22 is shiftable between 3 alternative positions one of which is shown in FIG. 1 and in which the vibrator 6 as well as the air ejector 8 is non-active. By shifting the control valve to the right in FIG. 1 the vibrator 6 is supplied with pressure air while the air ejector 8 remains non-active. In its third position, when the control valve is shifted to the left in FIG. 1, the air ejector 8 is supplied with pressure air while the vibrator 6 is non-active.

Figure 3:
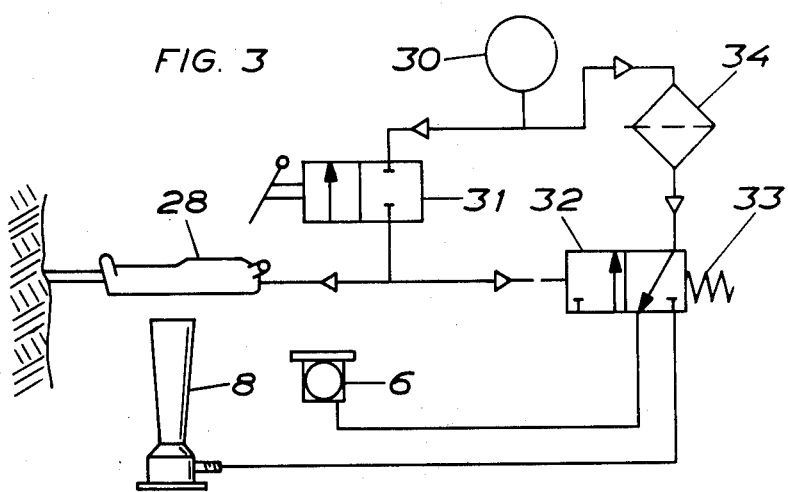
FIG. 3 is a schematic view of an automatic control system for the air ejector and the vibrator, which system is responsive to the pressure in the drill hole flushing air conduit of the rock drill

In FIG. 3 there is shown an alternative control system in which the pressure air supply to the air ejector 8 and the vibrator 6 respectively are responsive to the pressure in the flush air conduit of a rock drill 28. The complete system comprises a pressure air source 30, an air cleaner 34, a flush air throttle valve 31 and a selector valve 32. The latter is shiftable into its one position, to the right in FIG. 3, by means of pressure air and in the opposite direction by means of a spring 33. Pressure air is supplied to the drill hole flushing conduit of the rock drill by means of a throttle valve 31. In the position shown in FIG. 3 the flush air throttle valve 31 is closed and the drill hole is not supplied with any flush air. This also means that the selector valve 32 is not pressurized. The biasing force of the spring 23 keeps the valve 32 in a position in which the vibrator 6 is supplied with pressure air and the ejector 8 is non-active. When the rock drill is started and supplied with pressure air via the throttle valve 31, selector valve 32 is shifted toward its right hand position in which the air ejector 8 is supplied with pressure air while the vibrator 6 is non-active. Due to the design of the selector valve 32, the air ejector 8 and the vibrator 6 can never be activated at the same time, whereby the filter unit is protected from being vibrated during dust collecting.

Figure 4:
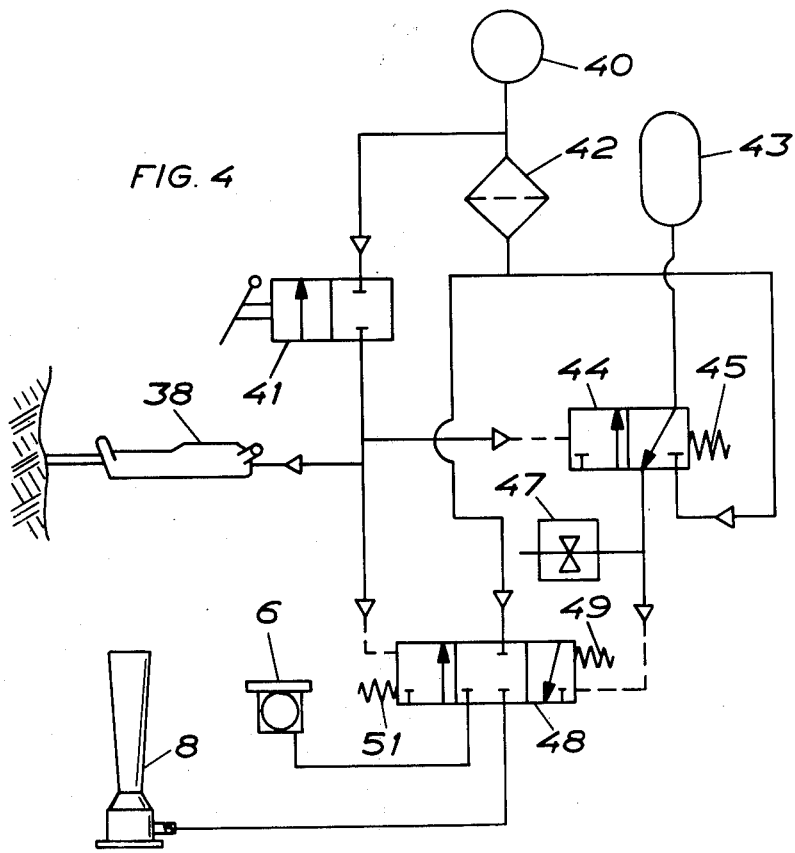
FIG. 4 is a schematic view of another automatic control system, which contains a timing unit for activating the vibrator for a certain, predetermined time interval.

In FIG. 4 there is shown another automatic control system which is connected to the flush air conduit of a rock drill 38 and which contains a timing unit by which the time of action of the vibrator is limited to a certain, predetermined value. This system comprises of a pressure air source 40, a flush air throttle valve 41, an air cleaner 42, a pressure air accumulator 43 and a feed valve 44 for the accumulator 43. The valve 44 is shiftable toward its one position by pressure air and biased toward its opposite position by a spring 45. This control system also contains an air flow restricting means 47 and a three position selector valve 48. The latter is biased in two directions by means of springs 49 and 51 in order to make it re-occupy its neutral position in which neither the ejector nor the vibrator is active. This selector valve 48 is shiftable between a vibrator activating position and an air ejector activating position. The position shown in FIG. 4 is a neutral rest position in which pressure air is not supplied to the flushing conduit of the rock drill and neither the air ejector nor the vibrator is active.

When drilling, the flush air throttle valve 41 is shifted towards its right hand position in which flush air passes into the flushing conduit of the rock drill. This also means that the one-way-biased valve 44 is pressurized and shifted towards its right hand position and the selector valve 48 also is shifted towards its right hand position against its biasing spring 49. In this position, pressure air enters the accumulator 43 via the valve 44 and pressure air is supplied to the air ejector 8 too. This position is maintained until the flush air throttle valve 41 is shifted into its left hand position wherein no pressure air can pass the valve. Then, the spring 45 biases the accumulator feed valve 44 towards its left hand position, whereby the pressure air supply to the accumulator 43 is interrupted. It means instead that the pressure air within the accumulator is supplied to the restricting means 47 and the selector valve 48.

As the throttle valve 41 is closed and the pressure upon the left hand side of the valve 48 has ceased, the latter is shifted towards its left hand position against the biasing force of the spring 51. In this position of selector valve 48 the vibrator 6 is supplied with pressure air and the ejector 8 is not. However, as the accumulator 43 is connected to the atmosphere via the air restricting means 47, the pressure air inside the accumulator leaks out successively. This means that, after a while, the pressure inside the accumulator 43 has decreased under a certain predetermined value, whereat it cannot withstand the biasing force of the spring 51. The selector valve 48 is then forced toward its left hand position. In this position pressure air passes through the selector valve 48 to the vibrator 6 but not to the air ejector 8.

By adjusting the size of the outlet opening of the restricting means 47, the time interval within which the vibrator is working could be chosen so as to meet the demand of an efficient filter unit cleaning but still to be short enough not to damage the filter unit.

At a manually operated rock drill, the flush air throttle valve is located at the rock drill itself, which means that the dust collecting device is operable from the rock drill. At a rig-mounted rock drill the flush air throttle valve is located on the rig. By using either of the two automatic control systems shown in FIGS. 3 and 4, there are no extra control means for the operator to handle for obtaining a proper operation of the dust collecting device.

The operating order of the dust collecting device provided with a manual control system as shown in FIG. 1 is hereinafter described.

By shifting the control valve 22 from its neutral position to the left in FIG. 1, the air ejector 8 is supplied with pressure air through the conduit 24. A current air flow through the housing 1 is accomplished (Illustrated by arrows in FIG. 1.) The dust containing air is sucked into the housing 1 through the hose 14 and the inlet 13. As the inlet 13 of the housing is directed tangentially a rotating of the air flow is accomplished by which the largest and heaviest particles are separated from the air flow. These particles fall down directly into the receptacle 15 while the small and light particles go up with the air flow and are separated from the air flow by the fabric hoses 3. To make it easier for the heavy particles to be separated, the inlet opening 13 has been directed somewhat downwardly.

When the dust collecting device has been working for a while, this period of time can be estimated from, for instance, the dust developed or the number of rock drills which have been connected to the device, the filter unit is choked up with dust and a cleaning is necessary. The filter unit cleaning is carried out in that the control valve 22 is shifted to its right hand position on which the air ejector 8 is non-active but the vibrator 6 is supplied with pressure air. The filter unit 2 is now exposed to vibrations which cause the collected dust particles within the fabric hoses 3 to shake loose and fall down into the receptacle 15. After a certain predetermined period of time, about one minute, the vibrating is discontinued and the filter unit is ready for another period of work. Then, the control valve 22 is shifted towards its intermediate closed position or to the left hand position to supply pressure air to the air ejector 8.

It is desirable to choose the capacity of the receptacle so that the latter has to be exchanged or emptied at about every three filter unit cleanings.

The method and the device according to the invention are very advantageous in that the filter unit 2 may be cleaned without opening the device which eliminates the risk of dust escape into the atmosphere. After the filter unit cleaning, the dust collecting device should be kept closed a period of time long enough to make sure that all dust that has been shaken loose from the filter unit has fallen down and set into the receptacle. Then, the strap 16 is removed and the plastic sack is lowered down and closed so that no dust is spread into the atmosphere. For continued dust collecting, another sack is mounted and the dust collecting device which is now completely cleaned and discharged is ready for another time of work.

The device shown in the drawings is adapted for use at manually operated rock drills and is very compact and easy to handle. It is very easy to set up in working position. All that is needed is a downwardly directed hole into which the one-leg stand could be lowered down. It is advisable to use a dust conveying hose 14 of such a length that fifteen or may be twenty holes can be drilled without moving the collecting device. When it has to be moved, it is a one-man job.

Of course, the capacity of the dust collecting device according to the invention can be adapted to bigger, crawler-mounted rock drills, by enlarging the housing, the filter unit, the dust receptacle and the air ejector capacity. When using a bigger filter unit, it is necessary to fit an additional vibrator. The latter could very well be attached to the socket frame at the lower end of the filter unit.

The invention is not limited to the shown and described embodiment but can be freely varied within the scope of the invention as defined in the appended claims.

What I claim is:

1. Method for collecting and separating dust at air-flushed rock drilling by means of a dust collecting device having a vibrator-cleaned filter unit, comprising the steps of:

selectively supplying flush air to the rock drill;
   circulating dust carrying air through the filter unit as the flush air is supplied to the rock drill;
   sensing the pressure within the flush air supply conduit and determining when the sensed pressure falls below a predetermined value;
   discontinuing the air circulation through the filter unit as the flush air supply to the rock drill is shut off responsive to said pressure within the flush air supply conduit falling below said predetermined value; and
   vibrating the filter unit only when the air circulation therethrough is discontinued responsive to said pressure within the flush air supply conduit falling below said predetermined value.

2. Method according to claim 1 comprising shutting off said air circulation and starting said vibration responsive to the flush air supply conduit being relieved of pressure.

3. Dust collecting device for use in air-flushed rock drilling with a rock drill having a flush air supply conduit, comprising:
   a housing;
   a flush air supply conduit of the rock drill;
   a fabric filter unit located within said housing;
   vibrator means arranged to impart vibrations to said filter unit for cleaning said filter unit;
   an air flow effecting means for establishing a dust transporting air flow through said housing; and
   control means coupled to said flush air supply conduit and to said vibrator means for sensing the pressure in said flush air supply conduit and for automatically activating said vibrator means and shutting off said air flow effecting means when the pressure within said flush air supply conduit falls below a predetermined value.

4. Device according to claim 3 wherein said control means activates said vibrator means and shuts off said air flow effecting means responsive to the flush air supply conduit being relieved of pressure.

5. Device according to claim 3 wherein said air flow effecting means is located down-stream of said filter unit.

6. Device according to claim 3 wherein said control means comprises a timing unit for activating said vibrator means for a limited, predetermined time interval.

7. Device according to claim 5 wherein said timing unit comprises a pressure air accumulator which is connected to the pressure air source when said air flow effecting means is active and which is discharged through a flow restricting means when said air flow effecting means is non-active, whereby said control means is biased towards its vibrator-activating position as long as said accumulator pressure exceeds a certain value.

8. Device according to claim 3 wherein said the filter unit includes a number of vertically arranged fabric hoses which are closed and which are attached to a common mounting frame at their upper ends, said mounting frame also carrying said vibrator means.

9. Device according to claim 8 comprising an additional vibrator means, and wherein said hoses are connected to a common socket frame at their lower ends, said socket frame carrying said additional vibrator means.

10. Device according to claim 3 wherein said air flow effecting means comprises an air ejector.

11. Device according to claim 10 wherein said air ejector is located down-stream of said filter unit.

12. Device according to claim 3 wherein said control means includes a three-position controller, wherein in a first position said vibrator means and said air flow effecting means are inactive, in a second position said vibrator means is active and said air flow effecting means is inactive, and in a third position said vibrator means is inactive and said air flow effecting means is active.

13. Device according to claim 12 wherein said control means includes at least one multi-position valve coupled to a pressure air source and which selectively coupled pressure air to said vibrator means and said air flow effecting means.

* * * * *